3,487,148
PARTIALLY DIGESTED M PROTEIN VACCINE AND METHOD OF MAKING SAME
Eugene N. Fox, Chicago, Ill., assignor to the United States of America as represented by the Secretary of the Department of Health, Education, and Welfare
No Drawing. Filed Apr. 18, 1967, Ser. No. 631,611
Int. Cl. C12k 5/00; A61k 23/00
U.S. Cl. 424—92                                10 Claims

ABSTRACT OF THE DISCLOSURE

Production of a streptococcal vaccine having attenuated cutaneous reactivity in humans by digesting M protein derived from the group A hemolytic streptococci with sufficient proteolytic enzyme to degrade the M protein through selective cleavage of peptide bonds without destroying the antigenic capacity of the protein. The digestion is preferably carried out using trypsin, chymotrypsin or mixtures thereof in concentrates of from about 0.05% to 0.5% by weight of the M protein, at a pH of from about 7.0 to 8.5 and a temperature of from about 20° C. to 50° C. and for a time of from about 30 seconds to 10 minutes.

---

This invention relates to a method of producing a new improved group A streptococcal vaccine having attenuated or diminished cutaneous reactivity such as to minimize delayed cutaneous hypersensitivity reactions in humans. The M proteins derived from the group A hemolytic streptococci are the antigens of which the vaccine is comprised. More particularly, this invention relates to a method of treating M proteins of the group A hemolytic streptococci with trypsin or other proteolytic enzymes in order to partially digest the protein and reduce or eliminate delayed cutaneous hypersensitivity reactions in human beings, while at the same time maintaining the immunogenic activity of vaccines prepared with these M proteins.

Epidemiological evidence accumulated over the past 20 years supports the conclusion that immunity to group A hemolytic streptococcal infection is type specific and experiments with laboratory animals confirm the major role of type-specific antibodies in protection against the group A Streptococcus (Lancefield, J., Immunol. 89, 307, 1962). The M proteins are the cell wall antigens responsible for the specificity of the 50 or more serotypes of group A hemolytic streptococci. The antibodies directed against the M proteins are protective by virtue of their opsonic capacity.

Recent work has demonstrated that several small doses, e.g., 10 micrograms, of highly purified M protein induce type-specific bactericidal antibodies in rabbits. (Fox and Wittner, J. Immunol., 97, 86, 1966). The success of these experiments was the impetus for the development of a streptococcal vaccine for the human use. With highly purified M proteins of types 12, 14 and 24, increased levels of circulating antibodies in both adults and infants have been observed. These studies have furnished data on the relative tolerance to M proteins and the possible extent of previous exposure to the serotypes. Secondary bactericidal antibody responses have been induced in adults by injecting M protein vaccines without provoking untoward local or systemic reactions in persons who exhibit no delayed hypersensitivity to the M antigen. Primary immunization has been carried out in infants with alum precipitated M protein. These infants have been shown to develop type-specific bactericidal antibodies to streptococci.

An important factor bearing on the usefulness of streptococcal vaccines is the possible occurrence of delayed hypersensitivity (sensitivity by way of allergy to bacteria) in human beings, especially adults, who may be the proposed subjects for immunization. It has been observed that approximately 80 percent of the adults skin-tested with various vaccines based on M proteins exhibit a specific skin reaction. This is interpreted to be a result of previous exposure, either clinical or subclinical, to these various streptococcal strains. From preliminary tests, it is inferred, but not clearly established, that persons with delayed skin reactions to the protein used in making the vaccine would likewise react adversely with the vaccine. It is postulated that such persons would display a more intense version of the skin reaction at the subcutaneous site of the vaccine inoculation. Transient fever and malaise would most likely accompany this type of reaction in its more intense form.

It is the purpose of this invention to obviate the adverse reactions in putatively hypersensitive persons by the partial digestion of the M protein using proteolytic enzymes such as trypsin. Trypsin digests or breaks down the M protein molecules into smaller molecules called polypeptides. Surprisingly, it has been found that the polypeptides formed by an incomplete digestion (in accordance with this invention) retain most of their antigenic and immunogenic capacity, but at the same time cause only minimal skin reactions, even in persons who provide to be hypersensitive with respect to the undigested protein.

The purified M protein antigen and the method by which it is extracted from the group A hemolytic streptococcal cell walls has been described in publications and in an earlier filed application, Ser. No. 624,318 filed Mar. 20, 1967. These methods of extraction and the purified M protein obtained thereby form no part of this invention.

Generally this invention resides in taking pure M protein at an appropriate concentration, and mixing it with a proteolytic enzyme, such as a solution of crystalline trypsin, in order to obtain an incomplete digestion of the M protein. This may be accomplished by using a ratio of trypsin to M protein of approximately 1:200 by weight. The trypsin may be allowed to react with the M protein at a neutral pH, at 37° C. for 5 minutes, at which time digestion may be stopped, either by the addition of a trypsin inhibitor (derived, for example, from soybeans) or by the precipitation of the partially digested attenuated M protein by neutralization of an added alum solution to form a complex of protein and aluminum hydroxide.

The method of partial digestion of M protein of this invention may be applied to the various M proteins derived from any of the various serotypes of the Lancefield group A streptococci. The M protein may be extracted from the streptococci, either whole or the cell walls thereof, by any convenient method. It has been found to be highly desirable, in connection with this invention, that the M protein be highly purified and that it be immunologically pure before being subjected to the partial digestion of this invention.

The partial enzymatic digestion of the M proteins, as contemplated by this invention, is best accomplished through the use of trypsin which attacks the peptide bonds of arginine and lysine. Actually, any enzyme may be used which will degrade the M protein through selective clearage of peptide bonds, but which will not destroy completely the antigenic activity of the M protein. Trypsin is the favored enzyme, owing to its highly selective attack on the peptide bonds of arginine and the lysine, and because trypsin inhibitor is readily available to limit the extent of peptide bond hydrolysis.

Chymotrypsin is also a useful enzyme for use in the partial digestion of the M protein since its selectively attacks tyrosine, phenylalamine and trytophan peptide bonds and can be inhibited through the use of certain trypsin inhibitors. Since the chymotrypsin which is commercially available is usually contaminated to some extent with trypsin, the digestive capacity of the trypsin contaminant may be attenuated through the use of a small portion of trypsin inhibitor or, alternatively, the chymotrypsin may be used in combination with the trypsin to carry out a partial digestion of the M protein. This invention contemplates that under some circumstances other proteolytic enzymes such as carboxypeptidase and aminopeptidase may be used to partially digest the M proteins.

The time required for the incomplete digestion will vary considerably according to the temperature and the pH at which the digestion takes place. The optimum time of digestion also may vary with different serotypes. The examples given below show the use of trypsin to digest various serotypes; a five-minute time has been found highly desirable for the conditions set forth in the examples illustrating the use of trypsin.

The examples recited below carry out the partial digestion at 37° C., although a wide range of temperatures may be used. Higher temperatures will cause the reaction to go somewhat faster, up to a certain point, before the enzyme and antigen are denatured, and lower temperatures will slow the reaction rate. Most of the examples given below show the digestion being carried out at pH 7.0, but the reaction may be conducted at higher or lower pH. It is recognized that the optimum pH for trypsin digestion is between 8.0 and 8.5, but in order to slow the digestion reaction and allow better control, the lower pH has been generally used.

The examples given below illustrate the use of a 200 to 1 protein to trypsin weight ratio. While greater or lesser ratios obviously may be used, the concentration of the trypsin or any other proteolytic enzyme which is used will vary the extent of the digestion reaction. Thus, the enzyme concentration should be appropriately coordinated with the pH, digestion time, and temperature.

The extent of digestion may be controlled by changing any of the variables, including time, temperature, pH, enzyme and enzyme concentration. Further, the optimum digestion conditions for one serotype may not be the optimum conditions for another serotype. The technique by which the M protein is extracted from the streptococcal cells or cell walls and the technique by which it is purified, also may have some effect on the optimum digestion conditions.

Several of the examples herein which illustrate the use of trypsin also disclose the use of soybean trypsin inhibitor. When this inhibitor is used, it is necessary to use at least a one molar equivalent, and preferably about 20 percent in excess of the stoichiometric requirements in order to completely combine with all the trypsin present. When using the soybean trypsin inhibitor, it is necessary to allow sufficient time for the inhibitor to form a complex with the trypsin in order to inactivate the proteolytic activity of the trypsin. While the use of such an inhibitor can be undesirable since it introduces an alien protein to the final product, soybean trypsin inhibitor has not yet evoked any allergic reactions among persons tested.

Example 2, below, shows the use of alum to directly precipitate the partially digested M protein from the solution without the use of soybean trypsin inhibitor. When this embodiment of the invention is used, the amount of alum used is determined by the desired ratio of M protein to aluminum hydroxide in the final product. That is, if a vaccine is desired which is to have a ratio of one milligram of aluminum hydroxide to 10 micrograms of M protein, it will be necessary to use a quantity of alum sufficient to provide the equivalent of 100 parts of aluminum hydroxide for each part of protein (by weight). Since the alum is highly acidic, a very small amount of alum is sufficient to stop the enzymatic digestion, and as little alum (computed as aluminum hydroxide) as ten times the weight of protein is sufficient to inhibit the enzymatic digestion. Other trypsin inhibitors such as those derived from pancreatic fluids, lima beans, egg white (ovomucoid), and colostrum may be used to terminate the digestion process. Likewise, various nontoxic chemical inhibitors may be useful under some conditions.

The extent of enzymatic digestion of the M protein may be determined by gel electrophoresis (Fox et al. J. Exptl. Med., 124, 1135, 1966). Adequate hydrolysis is indicated by the appearance of protein bands of higher mobilities than the original material and the complete disappearance of protein bands of the original antigen. Extended hydrolysis leading to the destruction of the antigen is indicated by the absence of most or all of the protein-staining material in the gel. It is the aim of this invention to partially digest all of the M protein molecules, but not to the extent that the antigenic capacity is destroyed.

The following procedure and examples are intended to illustrate the invention and set forth the best mode contemplated for carrying out said invention, but are not to be construed as any kind of limitation upon the scope of the invention.

EXAMPLE 1

Highly purified M proteins were prepared from group A hemolytic streptococcal cell walls as described by Fox and Wittner ("The multiple molecular structure of the M proteins of group A streptococci," Proc. Nat. Acad. Sci., 54, 1118, 1965). Six samples, each of which contained one milligram of type 12 purified M protein in 1.0 milliliter of buffered saline (0.01 M potassium phosphate and 0.15 M sodium chloride), were adjusted to pH 7.0 at 37° C. An additional control (Sample No. 7) containing no M protein was also made up. To each of these samples, except number 1 which was an untreated control, 5 micrograms of crystalline trypsin in 0.2 milliliter of saline were added and the mixtures were incubated at 37° C. After the time periods specified in Table I, ten micrograms of soybean trypsin inhibitor dissolved in 0.05 milliliter of saline was added to each sample. The temperature was maintained at 37° C. for an additional ten minutes and then the mixture was chilled to 0° C.

The resulting digested M protein samples were subjected to a precipitin reaction, and hemagglutination inhibition tests and to skin tests on adult human volunteers. The results of these tests are presented in Table I, which shows the changes in antigenic activities as the tryptic digestion was allowed to proceed beyond 5 minutes. Some loss of precipitating activity was observed after a 5-minute trypsin digestion, but the residual antigen still had the capacity to partially inhibit the hemagglutination reaction. Acrylamide gel electrophoresis of the various tryptic-digested M protein samples showed that within 5 minutes, the M protein molecules were entirely converted into polypeptides of new and lower molecular weights and higher mobilities, yet they maintained a considerable portion of the type-specific antigenic activity. The various (Sample 2) were fractionated by acrylamide gel electrophoresis, isolated and placed in wells of agar plates for immuno-diffusion reactions. These showed precipitin lines of specific identity formed with the type-specific antisera, indicating type-specific serologically active material remained.

The M protein which had been subjected to the five-minute digestion was tested in three adult volunteers known to be hypersensitive to undigested type 12 M protein. Each dose contained the equivalent of one microgram of M protein (as determined before the tryptic digestion). The volunteers exhibited only a minimum delayed cutaneous hypersensitivity to the partially digested M protein. It is assumed that the remaining low degree of delayed cutaneous hypersensitivity induced by the partially digested M proteins, was due to the residual polypeptides that were observed in the gel electrophoresis patterns.

These data demonstrate that the type 12 M protein capable of evoking a cutaneous response in hypersensitive persons may be partially digested with trypsin to virtually eliminate the cutaneous reaction and still maintain a portion of the type-specific antigenic reactivity.

TABLE I

| Sample | Time of trypsinization, min. | Precipitin reaction [1] | Hemagglutination Inhibition, test, reciprocal of dilution [2] | DCH to 1 microgram; diameter of erythema, cm. |
|---|---|---|---|---|
| 1 | [4] 0 | ++++ | 0 | [3] 6 |
| 2 | 1 | ++++ | 0 | [3] 4 |
| 3 | 5 | +++ | 12,800 | 1.5 |
| 4 | 15 | ++ | 25,600 | 1.0 |
| 5 | 30 | ± | 51,200 | (Omitted) |
| 6 | 90 | — | 102,400 | 0.6 |
| 7 | [5] 90 | — | 102,400 | 0 |

[1] Precipitin reaction recorded as estimated degree of precipitation in a capillary tube with undiluted USPH type 12 serum.
[2] Samples diluted to contain the equivalent of 80 micrograms of original M protein per milliliter; 0.5 milliliter were mixed with 0.5 milliliter of a 1:25 dilution of type 12 antiserum at 37° C. for 30 minutes before titration.
[3] Erythema accompanied by swelling and induration.
[4] No trypsin.
[5] No M protein.

EXAMPLE 2

A six milliliter sample containing 0.75 milligram of type 12 M protein per milliliter of saline, buffered with 0.01 molar potassium phosphate at pH 7.0, was subjected to a five-minute partial digestion using 80 micrograms of trypsin at 37° C. in a manner similar to that described in Example 1. At the conclusion of the five-minute digestion, the original sample was diluted to 60 milliliters with unbuffered saline and 24 milliliters of 0.2 molar alum was rapidly added. This was a sufficient quantity of alum to provide the equivalent of 400 milligrams of aluminum hydroxide. To the resulting solution was added 12.0 milliliters of 0.2 molar sodium acetate, pH 6.0 and a sufficient quantity of 1.0 molar sodium hydroxide was added to bring the resulting suspension to pH 7.0 (approximately 15 milliliters). The suspension was washed two times with 120 milliliters of Ringer's lactate buffer. The final suspension was made using 100 milliliters of lactate buffer and 0.005 percent of merthiolate (sodium ethylmercurithiosalicylate) preservative was added.

For various assay procedures, samples of the alum-precipitated partially-digested M protein were recovered in solution by dissolving aliquots of the aluminum hydroxide suspension in citrate buffer at pH 7.0. In vitro tests indicated the resulting protein was antigenically reactive and immunologically pure. A comparison of gel electrophoresis patterns of the recovered attenuated protein with the undegraded protein showed that none of the material remained undigested.

EXAMPLE 3

To a 10 milligram sample of type 3 M protein in 10 milliliters of buffered saline at pH 7.0, was added 50 micrograms of trypsin dissolved in 0.25 milliliter of saline. This mixture was incubated at 37° C. for five minutes and then chilled to 0° C.

EXAMPLE 3A

The ten milliliters resulting were divided, and a 6 milliliter sample (assumed to contain 6 milligrams of partially hydrolyzed type 3 M protein) was treated as follows: 3 milliliters of 0.2 molar alum at 0° C. were added to the 6 milliliter sample. The pH at this point was about 3.0. This mixture was allowed to stand for 30 minutes, at 0° C., followed by the addition of 3 milliliters of 0.2 molar sodium acetate pH 6.0. The suspension was adjusted to pH 7.0 with 1.0 molar sodium hydroxide. The assay procedures, as described above, indicated that the final suspension (in 5 milliliters of Ringer's lactate buffer) contained 400 micrograms of M protein and 5 mg. of aluminum hydroxide per milliliter.

EXAMPLE 3B

The other 4 milliliters, which were assumed to include 4 milligrams of partially hydrolyzed M protein, were treated with 40 micrograms of soybean trypsin inhibitor and incubated for 10 minutes at 37° C. A suspension was formed by the addition of 1.5 milliliters of saline, 1.5 milliliters of 0.2 molar alum and 0.75 milliliter of 0.2 molar sodium acetate, and sufficient 1.0 molar sodium hydroxide to reach a pH of 7.0. Analysis of this product showed that it contained 350 micrograms of partially digested protein and 5 mg. of aluminum hydroxide per milliliter in the final suspension of lactate buffer. A comparison of recovered attenuated M protein from dissolved vaccines of Examples 3A and 3B showed that they were identical. In other words, arresting the tryptic hydrolysis by addition of alum and neutralization to aluminum hydroxide produced a vaccine comparable to that prepared by the use of trypsin inhibitor. Acrylamide gel electrophoresis patterns of the two partially digested proteins were identical except for a band found in the pattern for the sample of Example 3B which was believed to be the trypsin inhibitor.

EXAMPLE 4

A 1.5 milligram sample of type 14 M protein in 0.3 milliliter of buffered saline was adjusted to pH 8.0 using 2.0 molar ammonium hydroxide (as shown by 0.0005 milliliter of 0.01 percent phenol red indicator). To this solution 3.5 micrograms of trypsin in 0.07 milliliter of saline were added and allowed to digest at 37° C. for 5 minutes. At the end of 5 minutes, 7 micrograms of soybean trypsin inhibitor in 0.07 milliliter of saline were added and allowed to react at 37° C. for 10 minutes. The solution was then chilled and subjected to the serological assaying procedures described in Example 1. The assay of the serological activity in the precipitin test showed a positive antigenic reactivity with type-specific rabbit antiserum. Acrylamide gel electrophoresis showed that substantially none of the original protein remained, but that it had been completely broken down into smaller more mobile fractions.

EXAMPLE 5

A proteolytic enzyme solution was prepared by dissolving crystalline chymotrypsin in phosphate-buffered saline at a concentration of 0.10 milligram of enzyme per milliliter. To this was added an equal volume of soybean trypsin inhibitor dissolved in phosphate-buffered saline at a concentration of 0.01 milligram of inhibitor per milliliter. To inhibit the activity of trace amounts of trypsin which may contaminate the chymotrypsin, the latter was treated with 10 percent of its weight of soybean trypsin inhibitor.

A one milliliter sample of phosphate-buffered saline containing 500 micrograms of type 12 M protein was prepared and adjusted to pH 7.0. To this was added 0.05 milliliter of the enzyme solution described above containing 2.5 micrograms. This was incubated in a water bath at 37° C. for the times indicated in Table II, after which a 0.2 milliliter sample was removed. An additional 0.5 microgram of soybean trypsin inhibitor dissolved in 0.01 milliliter of phosphate-buffered saline was added to each 0.2 milliliter sample in order to completely inactivate the chymotrypsin. The samples were then frozen and retained for further analyses.

The samples recovered after the chymotrypsin digestion were subjected to precipitin tests, agar gel diffusion plate analyses and acrylamide gel pattern analyses. The results of these tests are shown in Table II. These tests show that the chymotrypsin digests the type 12 protein to form large polypeptides which retain considerable portions of the type-specific antigenic reactivity and that a very short period of digestion is sufficient to cause the complete conversion of the original M protein molecule into smaller polypeptides. These tests demonstrate that not only will a short digestion time cause all of the original M protein molecules to be partially hydrolyzed, but that a reaction of longer duration will not cause much additional breakdown of the M protein molecule.

TABLE II

| Sample | Time of digestion | Precipitin reaction[1] |
|---|---|---|
| 1 | Undigested | ++++ |
| 2 | 30 seconds | +++ |
| 3 | 6.5 minutes | +++ |
| 4 | 10 minutes | +++ |
| 5 | 15 minutes | +++ |
| 6 | 30 minutes | +++ |
| 7 | Enzyme control [2] | − |

[1] Precipitin reaction recorded as an estimated degree of precipitation in a capillary tube with undiluted type 12 antiserum.
[2] Contained no M protein, but did contain enzymes.
For examples 2 through 6, the amount of precipitate was recorded about 20 minutes after the mixing of the antigen and the antiserum.

The various assay procedures available to those skilled in the art today, illustrate the differences and similarities between the vaccines of this invention and the purified undigested M proteins described in the prior art. A comparison of the acrylamide gel electrophoresis patterns of the undigested protein with the partially digested protein, illustrates the increased mobility of the partially digested M protein. The acrylamide gel pattern further demonstrates that the M protein molecule is broken up into various fractions by the partial digestion procedure. The serological activity of each of these fractions has been measured using the hemagglutination inhibition tests, the precipitin tests and agar gel immunodiffusion tests. The serological tests indicate that the partially digested fractions have antigenic reactivity, and are serologically pure in that they react with the same sera as does the undigested M protein.

The assay procedure for the partially digested protein prepared with the trypsin inhibitor is uncomplicated by the possibility of further tryptic digestion of the M protein following dissolution of the aluminum hydroxide suspension. In those cases where the partially digested M protein is precipitated directly on aluminum hydroxide, in order to assay the extent of enzymatic hydrolysis, it is necessary to first dissolve samples of the vaccine in citrate buffer at a neutral pH containing sufficient trypsin inhibitor (at least 100 percent of the theoretical requirement based on the amount of trypsin originally used). The resulting solution is then dialyzed against saline to remove the aluminum-citrate complex. The dissolved vaccine is then lyophilized to concentrate and then it may be serologically and chemically assayed.

As illustrated above, the partially digested M protein can be precipitated using alum to arrest the enzymatic reaction but it also can be precipitated with alcohol or other similar reagents which will be obvious to those skilled in the art. Likewise, the partially digested proteins of this invention may be used in vaccines containing adjuvants other than, or in addition to alum. For instance, oil emulsions and other pharmaceutical carriers or repository adjuvants may be used in combination with the antigens prepared in accordance with this invention. The vaccines described above have been buffered with Ringer's lactate buffer, but other sterile physiologically acceptable solutions, such as buffered saline may be used to suspend the active ingredients to make up a vaccine.

Although this invention has been herein described in detail and illustrated by examples, it is to be understood that these examples are for purposes of illustration only and that the invention is not limited thereto, reference being had to the appended claims for a definition of the scope of the invention.

I claim:
1. In a method of producing a streptococcal vaccine having attenuated cutaneous reactivity in human from M protein derived from the group A hemolytic streptococci, the improvement which comprises digesting said M protein with sufficient proteolytic enzyme to degrade the M protein through selective cleavage of peptide bonds without destroying the antigenic capacity of the protein, and recovering the antigenic components of the digested M protein.

2. The method of claim 1 wherein the proteolytic enzyme is selected from the group consisting of trypsin, chymotrypsin and mixtuers thereof, carboxypeptidase and aminopeptidase.

3. The method of claim 1 wherein the proteolytic enzyme is selected from the group consisting of trypsin, chymotrypsin and mixtures thereof and the enzyme concentration initially is about 0.05% to 0.5% by weight of the M protein concentration.

4. The method of claim 3 wherein the digestion is carried out at a temperature of about 20° C. to about 50° C., the pH of the digestion mixture is maintained at about 7.0 to 8.5 and the digestion is allowed to proceed for about 30 seconds to 10 minutes.

5. The method of claim 4 wherein the proteolytic enzyme is trypsin, the pH of the digestion mixture is maintained at about 7.0, the temperature of the digestion mixture is maintained at about 37° C., and the digestion is allowed to proceed for about 5 minutes.

6. The method of claim 4 wherein the digestion is terminated by adding at least at stoichiometric amount of soybean trypsin inhibitor to the digestion mixture.

7. The method of claim 4 wherein the digestion is terminated by adding sufficient alum to inhibit the enzymatic digestion.

8. In a method of producing a streptococcal vaccine having attenuated cutaneous reactivity in human from M protein derived from the group A hemolytic streptococci, the improvement which comprises digestion about 200 parts of said M protein with about 1 part of trypsin by weight for about 5 minutes while maintaining the temperature of the digestion mixture at about 37° C. and the pH at about 7.0 and recovering the antigenic components of the digested M protein.

9. A vaccine comprising effective quantities of the antigenic components derived from the method of claim 4 in combination with an adjuvant.

10. The vaccine of claim 9 wherein said adjuvant is aluminum hydroxide.

References Cited

Fox et al. (I), Journal of Experimental Medicine, vol. 124, pp. 1135–1151, 1966, 167–78 Bac.

Fox et al. (II), The Journal of Immunology, vol. 97, No. 1, pp. 86–94, 1966, 167–78 Bac.

RICHARD L. HUFF, Primary Examiner

U.S. Cl. X.R.

260—112